United States Patent [19]

DeHaan et al.

[11] Patent Number: 4,653,466
[45] Date of Patent: Mar. 31, 1987

[54] APPARATUS AND METHOD FOR REMOVING RECUPERATIVE CONDENSATE

[75] Inventors: Robert DeHaan; James H. Raudabaugh, both of Cedar Rapids, Iowa

[73] Assignee: Amana Refrigeration, Inc., Amana, Iowa

[21] Appl. No.: 456,173

[22] Filed: Jan. 6, 1983

[51] Int. Cl.[4] ............................................. F24H 3/02
[52] U.S. Cl. ............................. 126/110 R; 126/116 R
[58] Field of Search ............. 126/110 R, 116 R, 116 A

[56] References Cited

U.S. PATENT DOCUMENTS 2,651,294  9/1953  Horne ............................. 126/116 R
4,261,326  4/1981  Ihlenfield ........................ 126/110 R
4,318,392  3/1982  Schreiber et al. .............. 126/116 A Primary Examiner—Carroll B. Dority, Jr.
Attorney, Agent, or Firm—William R. Clark; Richard M. Sharkansky

[57] ABSTRACT

A furnace having a recuperative heat exchanger including apparatus for draining condensate and then flushing the exchanger with water to remove residual condensate. The recuperative heat exchanger lowers the temperature of the products of combustion from approximately 500° F. to approximately 100° F. thereby recovering sensible heat and heat of condensation before exhaust into the flue. Preferably, the recuperative heat exchanger functions as a preheater for forced air which is then directed past a second heat exchanger adapted to receive a circulating fluid which is heated by the combustion burner.

12 Claims, 7 Drawing Figures

APPARATUS AND METHOD FOR REMOVING RECUPERATIVE CONDENSATE

BACKGROUND OF THE INVENTION

Recuperative furnaces are well known in the art. They are also known as condensing furnaces. They are distinguished from conventional or non-condensing furnaces by their recovery of a portion of the latent, as well as sensible, heat of the water vapor formed in the combustion process.

Non-condensing furnaces exhaust flue or vent gases at temperatures up to 550° F. As a result, such furnaces produce flue gases in which the water generated by the combustion processes remains in the gaseous state; the latent heat of vaporization is not recovered. The efficiency of a furnace which operates in a non condensing mode generally has a maximum in the range from 75 to 85 percent. On a seasonal basis, this efficiency is reduced because usable heat is also lost up the chimney through a draft hood during the cool-down period at the end of each heating cycle.

Recuperative furnaces, on the other hand, do not employ draft hoods. The flue products are cooled to the dew point while still in the appliance, and some of the latent heat of vaporization is recovered as usable energy. This results in substantially higher efficiencies as less energy is lost out the flue. Vent gas temperatures may be as low as 100° F. and there are few, if any, off cycle losses. Accordingly, depending on the type of condensing or recuperative furnace, efficiencies can be in the low to high 90 percent range.

The condensate produced by a recuperative furnace has a typical pH range of two to six; it is mildly acidic and potentially corrosive. By contrast, normal household waste water tends to be slightly alkaline. Its pH runs on the high side of seven.

The primary difference between the environment in a condensing or recuperative heat exchanger furnace and a conventional furnace is the presence of liquid water. The various gases in the flue gas dissolve in this water to form such acids as carbonic, sulfurous, sulfuric, nitric and nitrous. Dissolved oxygen and carbon monoxide are also present. The acid gases lower the pH of the water and promote acid corrosive attack. The combination of carbon monoxide and carbon dioxide may produce stress corrosion attacking some materials of construction as well. Likewise, sulfurous acid has been shown to promote stress corrosion cracking and intergranular attack of some materials.

The liquid water and hence the area of corrosion in a condensing heat exchanger occurs beyond the point at which the temperature of the flue gas falls below the water dew point. The dew point varies with the amount of excess air. However, increasing the amount of excess air is not the solution to the problem since excess air increases stack losses, thereby reducing furnace efficiency.

The acid dew point of flue gas is the temperature at which the acid compound sulfuric acid will drop out as a liquid. This temperature which is on the order of 260° F. is much higher than the water dew point. Sulfurous, nitric, nitrous and carbonic acids will only be found below the water dew point because they only exist in a water solution.

The corrosive effects of these various acids on the furnace will vary from furnace to furnace and from fuel to fuel. Localized attack is probably the major problem to contend with, either in the form of pitting or possibly intergranular attack. Attack at welds is particularly critical. Sensitization of austenitic materials by welding promotes both intergranular attack and stress corrosion cracking. Welded construction may also introduce crevices in which accelerated attack may occur. Cyclic stressing of condensing a heat exchanger may result in shortening of the fatigue life by the mechanism of corrosion fatigue. Galvanic corrosion is also a possibility if two or more alloys are connected in the wet zone of a heat exchanger or at the drain. Use of two different materials is usually accomplished by brazing in which case the resistance of the braze itself and also the galvanic action must be considered.

The rate of attack of these corrosion mechanisms is dependent upon the design and the construction of each furnace. The use of materials such as stainless steel and plastic-coated parts will reduce the effects of corrosion. The direction of flow of condensate is also important. A furnace, for example, where the flue gas is forced up and out of the furnace will create a situation of condensation, run-down, and re-evaporation which will result in retention and concentration of sulfuric acid and high corrosion rates.

SUMMARY OF THE INVENTION

The primary object of the invention is to provide a recuperative heat exchanger wherein the corrosive effects of the mildly acidic condensate are reduced.

Another object of the invention is to provide a recuperative furnace wherein the condensate is drained from the recuperative heat exchanger and tap water is periodically flushed through the system to remove the residual condensate.

Another object of the invention is to minimize the corrosive effects of the flue condensate on welded joints of the recuperative heat exchanger by periodically flushing tap water through the system.

Another object is to provide a recuperative heat exchanger in a recuperative furnace in which the particular sensitive areas to corrosion, such as crevices and welds, are constantly emersed in liquid and periodically flushed by tap water.

These and other objects and advantages are provided by the invention which discloses a forced air heating system, comprising means for combusting fuel, a recuperative heat exchanger adapted for receiving products of combustion from the combusting means, means for forcing air into heat exchange relationship with the recuperative exchanger, the air being heated by thermal transfer from the products of combustion and being heated by heat of condensation resulting from a portion of the products of combustion condensing in the recuperative heat exchanger, and means for flushing condensed products of combusion from the system. It may be preferable that the system also comprise a second heat exchanger which is adapted for receiving a fluid heated by the combusting means, wherein the air is also forced in heat exchange relationship with the second exchanger. The recuperative heat exchanger preferably includes a plurality of stainless steel tubes surrounded by heat exchange fins, the tubes being coupled at their respective ends by stainless steel input and exhaust manifolds. Further, it is preferable that the flushing means comprises means for directing a flow of water through the input and exhaust manifolds to remove condensate residue. The combusting means and flushing means should be energized alternately. More specifically, the recuperative heat exchanger should be flushed with tap water after each burning cycle. "Recuperative" is herein meant to define the process whereby the temperature of flue gases is lowered before being exhausted from the system whereby sensible heat and latent heat of vaporization is recovered thereby increasing the efficiency of the system.

The invention may also be practiced by a forced air heating system comprising means for combusting fuel having an outlet for exhausting gaseous products of combustion, a heat exchanger, a manifold coupled between the outlet and the heat exchanger for directing the gaseous products of combustion to the heat exchanger, means for forcing air against the heat exchanger, the air being heated by thermal transfer from the gaseous products of combustion and being heated by heat of condensation given off by a portion of the gaseous products of combustion condensing in the heat exchanger, means for draining condensate from the heat exchanger and the manifold, and means for flushing water through the manifold after a combustion cycle of the combusting means to remove residual condensate. Preferably, the system also comprises an exhaust manifold coupled to the output of the heat exchanger wherein the condensate draining means and flushing means are also connected to the exhaust manifold.

The invention also discloses the method of heating forced hot air in a residential burner, comprising the steps of combusting fuel, passing the products of combustion through a manifold to a plurality of tubes of a recuperative heat exchanger, forcing air over the heat exchanger to heat the air from thermal transfer from the products of combustion and from heat of condensation from the products of combustion condensing in the heat exchanger, draining the condensate formed by the condensing from the tubes and the manifold, and flushing water through the manifold after the completion of a burning cycle to remove residual condensate.

BRIEF DESCRIPTION OF THE DRAWINGS

The foregoing and other objects and advantages of the invention will be more readily understood by reading the Description of the Preferred Embodiment wherein.

DESCRIPTION OF THE PREFERRED EMBODIMENT

Figure 1:
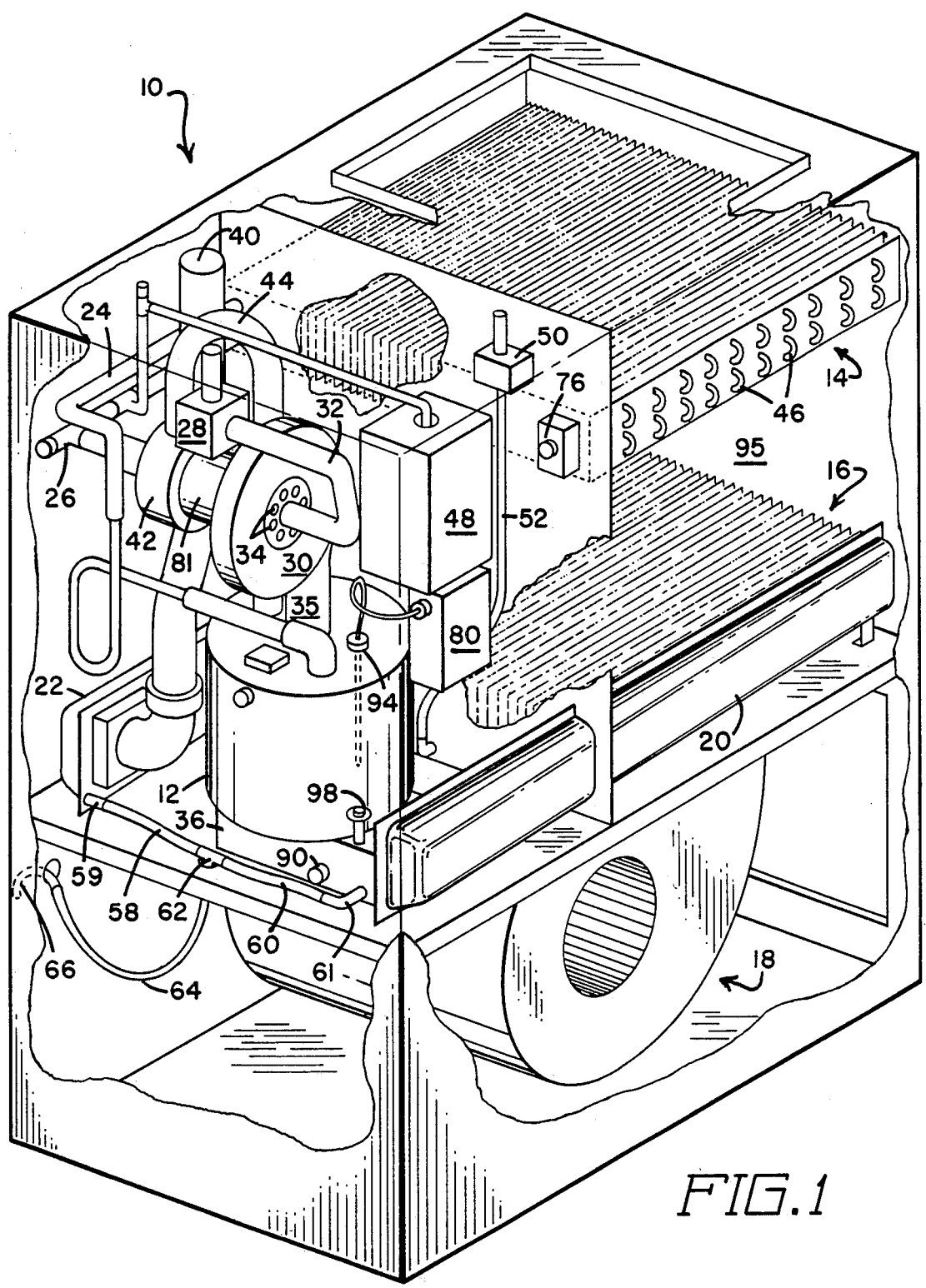
FIG. 1 is an illustrative, partially broken away perspective view of a recuperative furnace embodying the invention.

Referring now to the drawings, wherein like numerals refer to the like parts, and more particularly to FIG. 1, there is shown in a partially broken away, perspective view a recuperative furnace 10. Furnace 10 is broadly made up of a burner and heat exchange module 12, a secondary heat exchanger 14, a recuperative heat exchanger 16 and a blower assembly 18. Module 12 is connected to recuperative heat exchanger or recuperator 16 by conduit 36 and manifold 20. Module 12 is connected to secondary heat exchanger 14 by solution lines 24 and 26.

Figure 2:
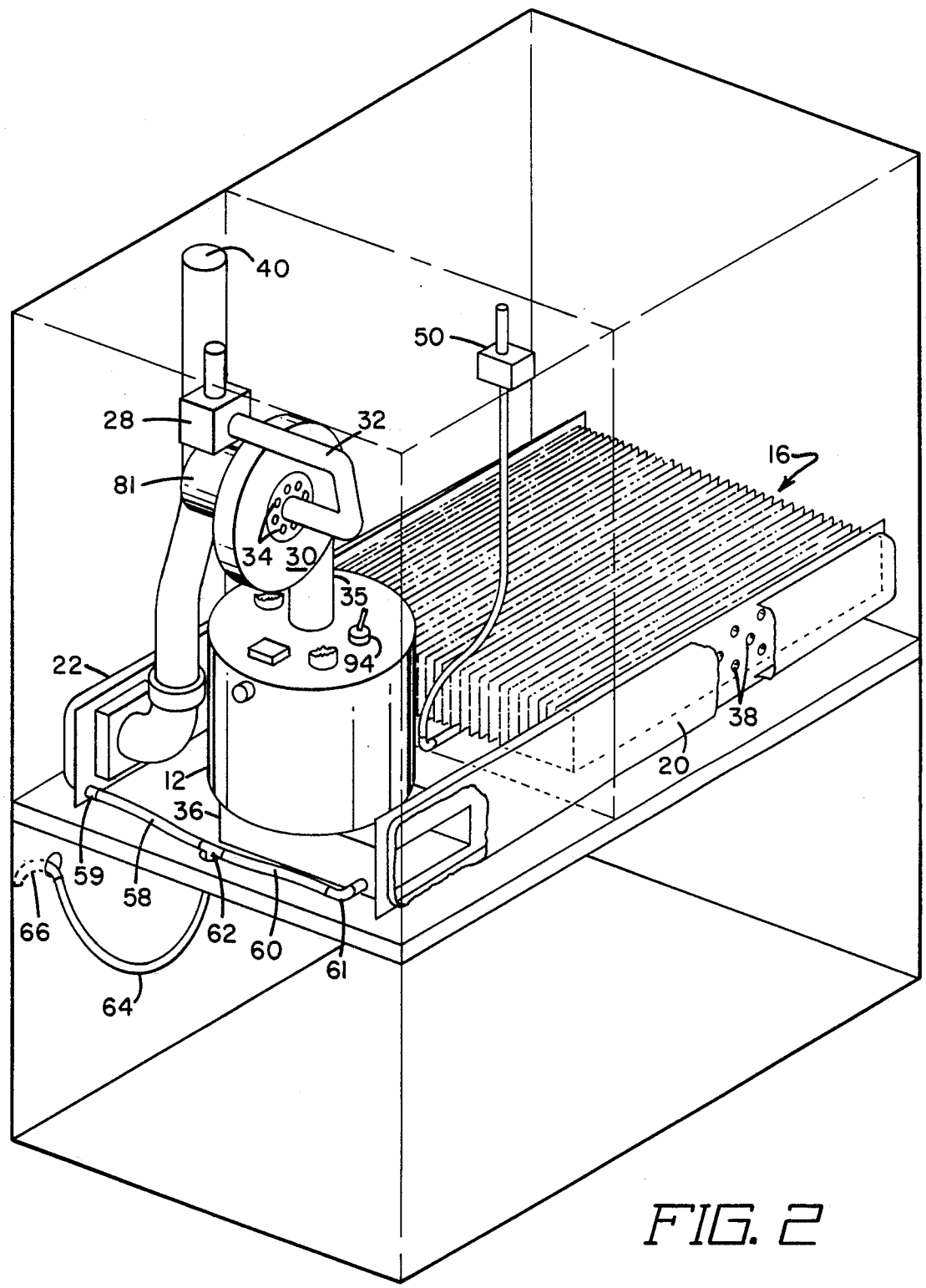
FIG. 2 is a perspective view of FIG. 1 with some of the parts omitted thereby illustrating the recuperative heat exchanger and associated water flushing system.

The flow of fuel and flue gases may best be seen in FIG. 2 wherein, for illustration, the view of FIG. 1 is shown with some of the parts omitted. Upon a call for heat and in accordance with the controls of the furnace as will be described in detail later herein with particular reference to FIG. 7, electricity flows through a ceramic ignitor tip (not shown) heating it to approximately 2,500° F. Then, combustion air blower 30 is activated and fuel valve 28 is opened. Blower 30 mixes a gas and air mixture with the gas being provided from conduit 32 running from valve 28 and the air being supplied through apertures 34. From blower 30, the air and fuel mixture is forced via duct 35 into module 12. As the mixture passes over the hot ignitor tip, ignition occurs and combustion begins. The detailed construction of module 12 and secondary heat exchanger 14 and their related operation may be fully understood from U.S. Pat. Nos. 3,936,003; 3,967,590; 3,997,109, 4,135,487 and 4,171,772, which are hereby incorporated by reference.

The products of combustion are exhausted downwardly from module 12 into conduit 36. In fact, module 12 is inverted from what may heretofore have been considered its standard configuration. The combustion by-products travel along manifold 20 and into tubes 38 within recuperator 16. Recuperator 16 is of fin and tube construction as is well known in the art. Manifolds 20 and 22 are welded to recuperator 16.

Within tubes 38, the combustion by-products are partially condensed and accordingly, part of the latent heat of water vapor is recovered. The remaining gases flow out tubes 38 and into manifold 22. From manifold 22, the gases are exhausted from the furnace through vent pipe 40. The flue gases may then be exhausted from the home or other enclosure in much the same fashion as conventional furnaces or even conventional laundry equipment, i.e., there is no need for extensive chimneys or the like since the exhaust temperatures are typically in the range of 100° to 120° F.

Figure 3:
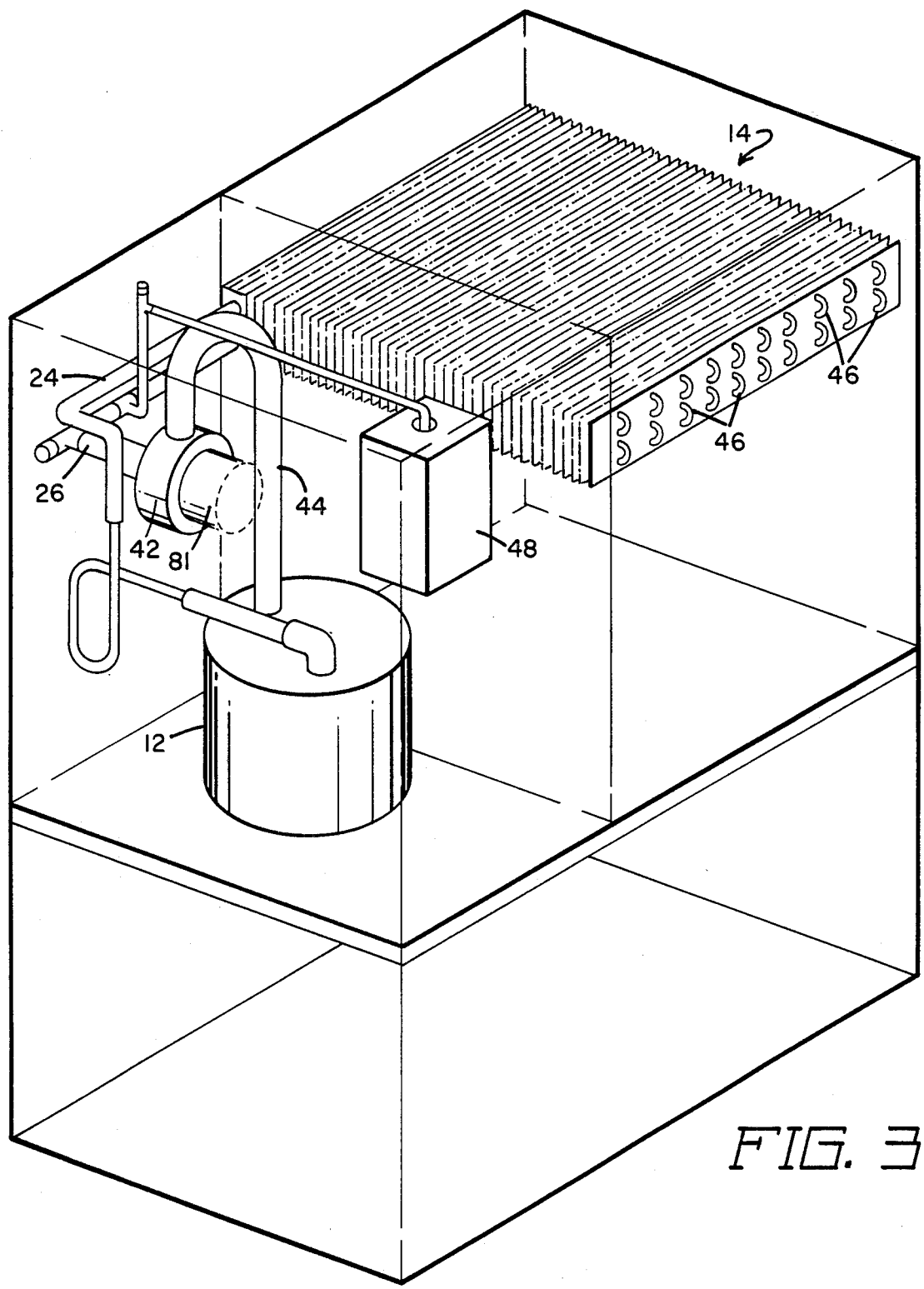
FIG. 3 is a perspective view of FIG. 1 with some of the parts omitted thereby illustrating the primary and secondary heat exchanger closed loop.

Turning now to FIG. 3, wherein, for illustration, the view of FIG. 1 is shown with some of the parts omitted, the flow of the primary heat exchange medium will be described. Upon a call for heat and in accordance with the controls of the furnace as will be described in detail later herein with particular reference to FIG. 7, solution pump 42 is activated. Pump 42 is connected at its inlet to line 26 which communicates with tubes 46 of secondary heat exchanger 14. At its outlet, pump 42 is connected by line 44 to module 12. Line 44 communicates with tubes (not shown) passing through module 12 and the closed loop back to tubes 46 of the secondary heat exchanger is completed by line 24. As is well known in the art, in conjunction with lines 24, 26, and 44, a solution such as ethylene or propylene glycol and water is circulated in a closed loop between module 12 which is considered the primary heat exchanger and secondary heat exchanger 14. Heat which is added to the solution by combustion within module 12 is given off in the secondary heat exchanger.

If for any reason the furnace malfunctions or exceeds its temperature limits or the solution expands beyond the capacity of the closed loop between module 12 and secondary heat exchanger 14, the solution overflows to atmospheric overflow tank 48 which functions in a similar manner to the overflow tanks that are in common use in many automobile radiator systems. In general, tank 48 acts as a reserve to accomodate any excess solution volume such as may be caused by thermal expansion.

As mentioned earlier herein, a condensate is formed in the recuperative heat exchanger or recuperator 16 as the combustion by-products cool therein. The removal and flushing of such condensate to overcome the problem of corrosion is best described with reference to FIGS. 2, 4, 5 and 6. Firing continuously, recuperative heat exchanger 16 may yield approximately three quarts of condensate per hour which corresponds to a substantial amount of recuperated latent heat of vaporization. Tubes 38 of recuperator 16 may be sloped downwardly towards respective manifolds 20 and 22 so as to accelerate the drainage of condensate. Further, manifolds 20 and 22 may be attached with a downward slope towards the front of furnace 10 so that condensate will rapidly drain towards lines 58 and 60, respectively, as shown best in FIG. 4. Lines 58 and 60 are joined at junction 62 so that liquid from respective manifolds 20 and 22 flows out of furnace 10 through trap 64. The condensate is removed from furnace 10 through elbow 66 which is connected to trap 64. The height of elbow 66 from the base of furnace 10 is important. If it is lower than the low point in trap 64, lines 58 and 60 and trap 64 will totally drain. If this happened, uncondensed flue gases remaining in manifold 22 would have an alternate path to the outside. Instead of being exhausted out vent pipe 40, the flue gases could escape through elbow 66. The result could be an accumulation of undesirable gases within the enclosure to be heated. If, on the other hand, elbow 66 is placed higher than drain 61, the diluted condensate will not properly drain from furnace 10, and manifolds 20 and 22 will retain excess liquid, restricting their volume and thereby affecting their performance. The most convenient means of disposal of the condensate from elbow 66 is in the domestic sanitary drain system where hundreds of gallons of waste water flow each day. Under normal conditions, the mildly acidic condensate is diluted and buffered by the normal sanitary system effluent.

Figure 5:
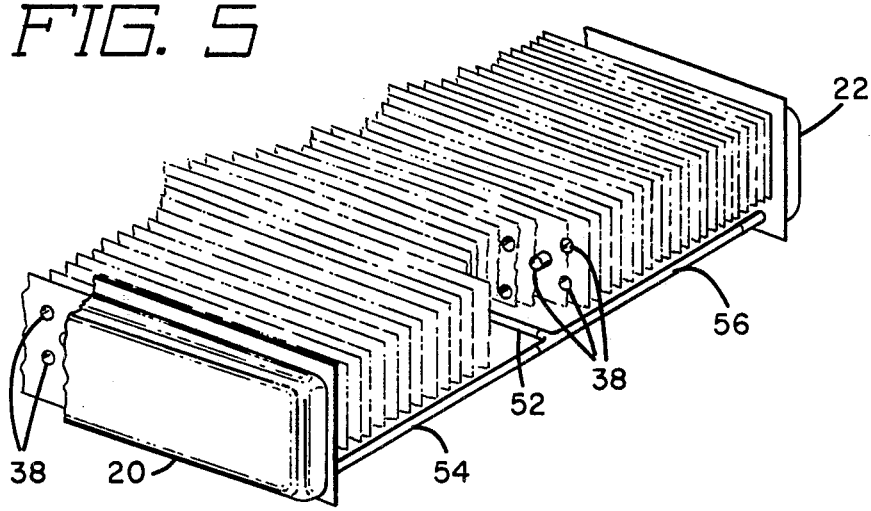
FIG. 5 is a rear perspective, partially broken out view of the recuperative heat exchanger and related condensate draining and water flushing system.

Manifolds 20 and 22 and tubes 28 are fabricated of stainless steel to resist corrosion by the mildly acidic condensate. Furthermore, at the end of each heating cycle, fresh water is flushed through the manifolds and out the drain to wash away residual condensate. More specifically, referring first to FIG. 2, a source of tap water is connected to water valve 50. Upon a call for water after a heating cycle as will be described in more detail later herein, water flows through line 52 down and underneath to the rear of recuperator 16 as shown in FIG. 5. At the rear of recuperator 16, line 52 branches into lines 54 and 56. Line 54 supplies water to manifold 20. Line 56 supplies water to manifold 22. The flushing water containing diluted residual condensate flows along the same path as described earlier herein for the condensate. More specifically, the flush flows forward in respective manifolds 20 and 22 and lines 58 and 60 and exits through trap 64 and elbow 66.

Figure 4:
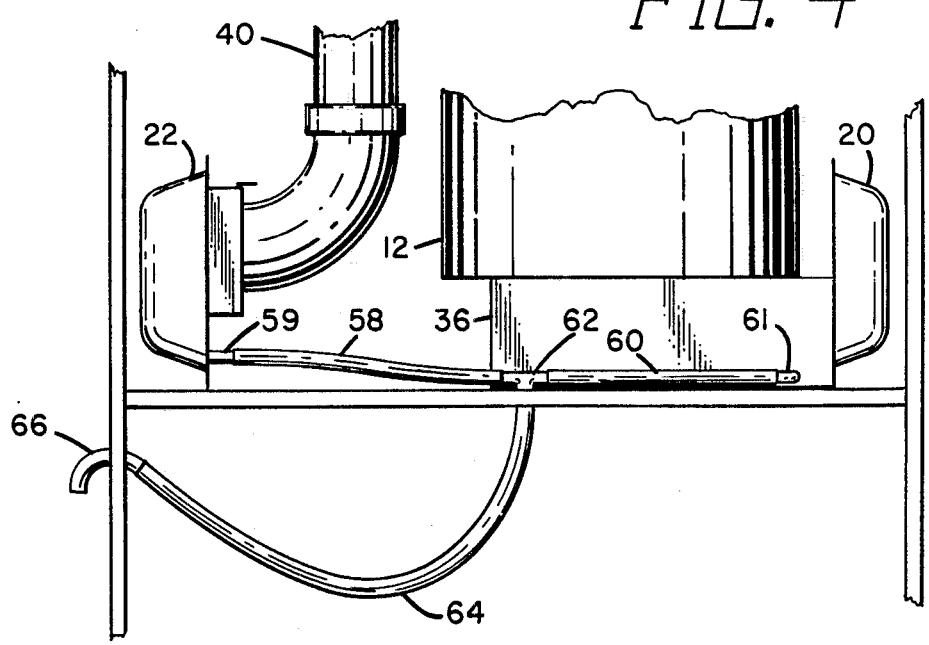
FIG. 4 is a front view of the central portion of the furnace of FIG. 1 showing draining apparatus.
Figure 6:
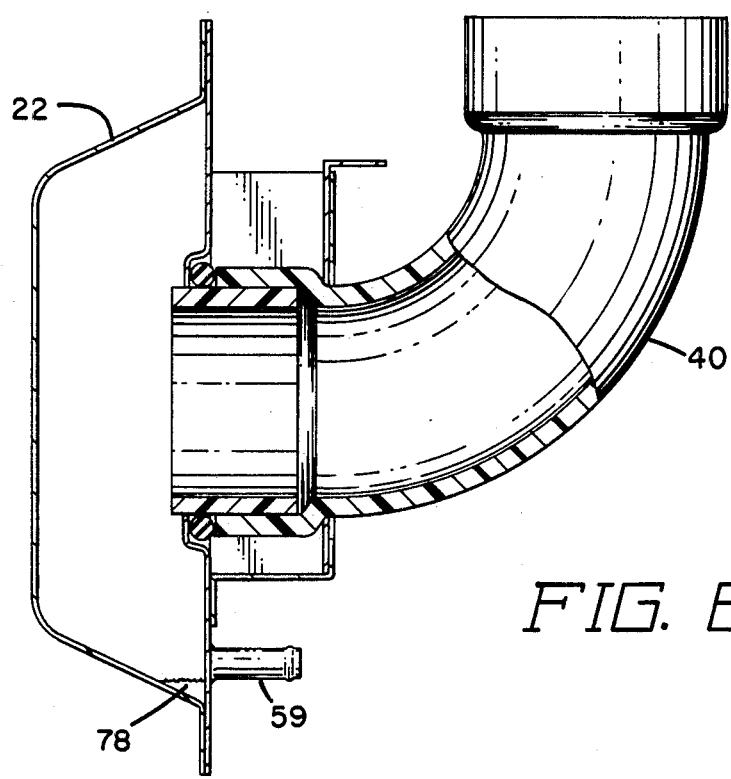
FIG. 6 is a front, partially broken away view of the connection between manifold 22 and flue 40.

As shown in FIGS. 4 and 6, lines 58 and 60 are connected to manifold 22 and conduit 36 at drains 59 and 61, respectively, slightly above their internal floors. This allows tap water 78 to remain standing in the manifolds at all times to provide two advantages. First, it insures that any condensate not washed out during the flushing process will be diluted by the remaining tap water. Second, it insures that any condensate flowing into the manifolds from recuperator 16 or vent pipe 40 after the flushing process has been completed will still be diluted.

Figure 7:
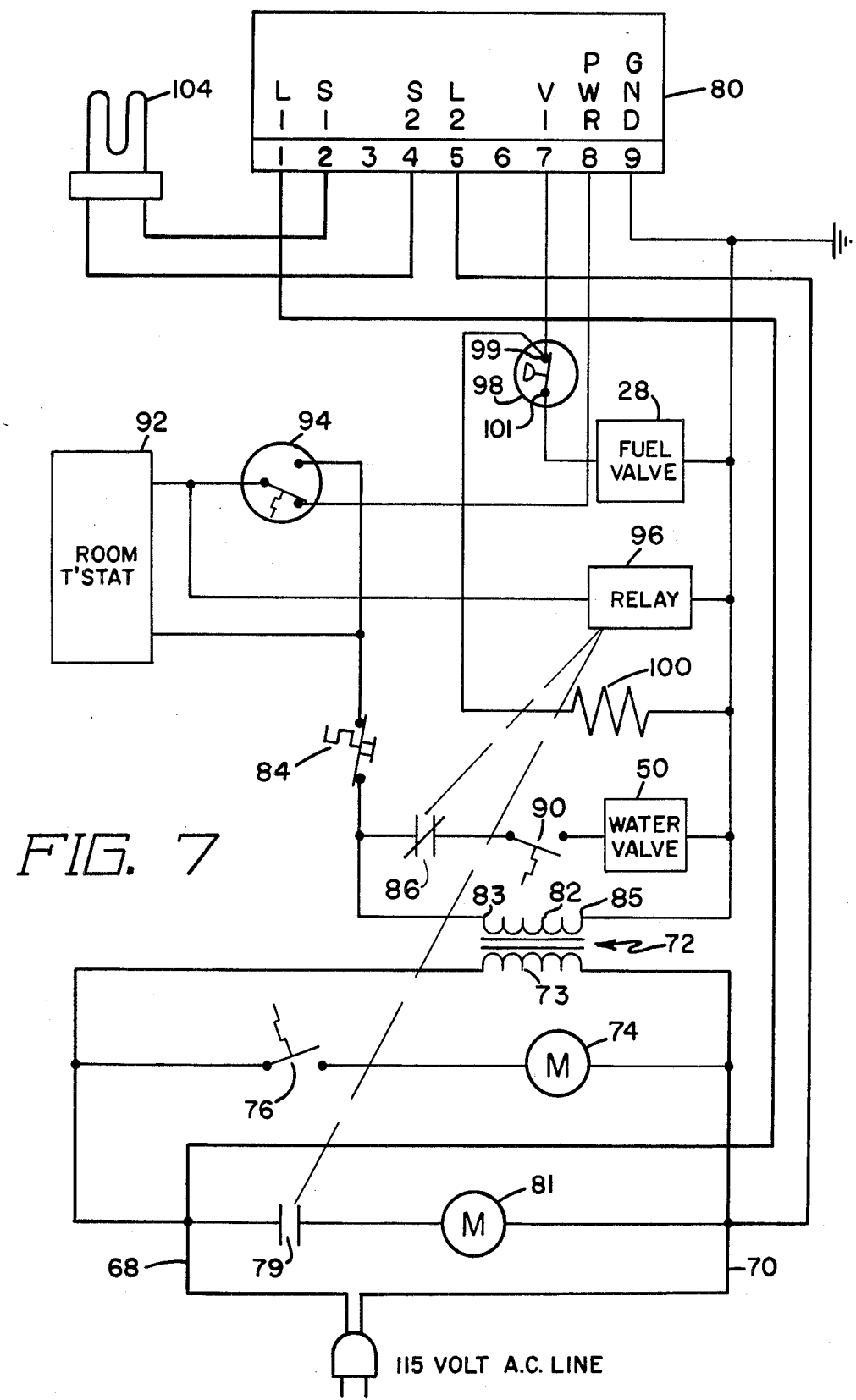
FIG. 7 is an illustrative electrical schematic for the controller of the recuperative furnace of FIG. 1.

Referring to FIG. 7, there is shown an illustrative electrical schematic which functions as the controller for the recuperative furnace of FIG. 1. Terminals 68 and 70 are connected to a standard household 115 volt ac source as shown. Accordingly, the ac voltage appears across the series of combustion air blower/pump motor 81 and combustion air blower/pump control contacts 79 which are normally open, the series of blower motor 74 and blower control contacts 76 which are temperature activated and normally open, the primary winding 73 of stepdown transformer 72, and terminals 1 and 5 of ignition control 80. The voltage across the secondary winding 82 of stepdown transformer 72 is reduced to approximately 24 volts. This secondary voltage appears across the series of water valve 50, normally closed contacts 86, and normally open temperature activated contacts 90. Further, side 83 of secondary winding 82 is connected through a secondary limiter 84 which consists of manually reset normally closed temperature activated contacts 84 to one terminal of room thermostat 92 and one switch terminal of water limiter 94 which consists of single pole double throw temperature activated contacts 94 as shown. The opposite switch terminal of water limiter 94 is connected to power input terminal 8 of ignition control 80. The second terminal of room thermostat 92 is an input to water limiter 94 and relay 96. Side 85 of secondary winding 82 is connected through blower control resistance heater 100 to terminal 99 of pressure switch 98, to the second terminal of relay 96, through fuel valve 28 to terminal 101 of pressure switch 98, and to grounded terminal 9 of ignition control 80. Terminal 7 of ignition control 80 is connected to terminal 99 of pressure switch 98. Further, ignitor 104 which was described earlier as a ceramic electronic ignitor tip is connected across terminals 2 and 4 of ignitor control 80. The components described herein with reference to FIG. 7 are conventional and well known in the art. For example, although the functions of ignition control 80 as described herein could be performed using a plurality of relays, it may be preferable to use a solid state device which is commercially available from Fenwal Inc., Division of Kidde, Inc., of Ashland, Mass., as catalogue order No. 05-212225-107. Also, ignitor 104 is commercially available as Model No. 201A from Norton Company of Milford, N.H.

Upon call for heat from room thermostat 92 as mentioned earlier herein, contacts internal thereto close allowing current to flow from secondary winding 82, through secondary limiter 84, thermostat 92, and water limiter 94 thereby energizing the power terminal of ignition control 80. Current also flows from room thermostat 92 activating relay 96. The activation of relay 96 opens normally closed contacts 86 and closes normally open contacts 79.

Closing contacts 79 completes the line voltage circuit through motor 81 that drives both the solution pump 42 and the combustion air blower 30. Accordingly, pump 42 begins to circulate the ethylene or propylene glycol and water mixture through the closed loop piping as described earlier herein. Also, blower 30 commences operation and creates a negative pressure at the outlet of fuel valve 28.

The energizing of ignition control 80 causes ignitor 104 to be energized by internally connecting pin 1 to pin 2 and pin 4 to pin 5 within ignition control 80.

After a time delay in which ignitor 104 heats to its specified ignition temperature, ignition control 80 opens fuel valve 28 and energizes blower control resistance heater 100 by internally providing power from pin 8 to pin 7. Pin 7 is connected to fuel valve 28 through pressure switch 98.

Activation of fuel valve 28 allows gas to be drawn into blower 30 for mixture with air which enters through apertures 34. The fuel and air mixture is then forced into module 12 where it is ignited by ignitor 104. Some desirable safety interlocks are not described herein because they form no part of the invention. The ignition and burning of the mixture provides heat which is transferred to the ethylene or propylene glycol and water mixture simultaneously flowing through module 12.

When blower control resistance heater 100 has reached a predetermined temperature, blower control contacts 76, which are in heat exchange relationship with heater 100, close to complete a line voltage circuit through blower motor 74. Motor 74 turns blower assembly 18 to move return air through furnace 10 as shown in FIG. 1. Cool air returning from the home or other enclosure to be heated is drawn into the blower assembly 18 from a return air duct, not shown. It typically may be at a temperature of 67° F.

The air is typically preheated or warmed by passage through tube and fin recuperative heat exchanger 16° to 77° F. The high efficiency of furnace 10 is in part a result of the recuperative process wherein flue gases are exhausted at a relative low temperature, such as, for example, in the range from 100° F. to 120° F. In non-recuperative furnaces, as is well known in the art, flue gases may be exhausted at temperatures on the order of 500° F. which substantially reduces the efficiency due to the lost heat. In accordance with the invention, not only is sensible heat extracted from the flue gases by recuperator 16, but also latent heat is recovered by the condensation of flue gases. Because the relatively cool return air passes over recuperative heat exchanger 16 first, recovery of latent heat of vaporization by condensation is enhanced. Heat is transferred to the air which is forced through recuperator 16 by blower 30.

After being preheated by recuperator 16, the air continues upward in channel 95 and through secondary heat exchanger 14. The temperature of the air may typically be elevated to approximately 136° F. by heat transferred from the heated glycol and water mixture flowing through the fin and tube construction of heat exchanger 14. From heat exchanger 14, the air may be forced through conventional duct work to the enclosure or home to be heated.

When room thermostat 92 is satisfied, the secondary voltage circuit through it is opened thereby removing power to ignition control 80 and relay 96. When power is removed from ignition control 80, ignitor 104 is deactivated and fuel valve 28 closes. When power is removed from relay 96, contacts 79 are opened and contacts 86 are closed. The opening of contacts 79 interupts the ac line voltage circuit across motor 81 thereby removing drive to solution pump 42 and combustion air blower 30. The closing of contacts 86 provide secondary voltage to the series of contacts 90 and water valve 50.

Contacts 90 which function as a thermal switch are physically located on conduit 36. When heated by the flow of combustion by-products through conduit 36 during operation of furnace 10, contacts 90 close. Therefore, when contacts 86 close by the deactivation of relay 96, water valve 50 is energized allowing tap water to flow through line 52 as previously described. The flow of water through recuperator 16 continues until conduit 36 cools to a predetermined temperature and then temperature activated contacts 90 open to terminate the condensate flushing process.

Similarly, motor 74 continues to drive blower assembly 18 to force heated air into the home or other enclosure to be heated until blower control contacts 76 open. Blower control contacts 76 are in heat exchange relationship with secondary heat exchanger 14 and sense the temperature of exchanger 14. As with contacts 90, control contacts 76 open at a predetermined temperature.

Water limiter 94 and pressure switch 98 are safety devices designed to prevent furnace 10 from operating under unusual circumstances. Water limiter 94 is a commercially available thermal switch. It is positioned within module 12 as shown in FIG. 1. In the unlikely event of a loss of glycol and water mixture or other cause for overheating of module 12, water limiter 94 de-energizes ignition control 80 and, instead, only relay 96 is powered. This continues the circulation of cooling solution through module 12. Water limiter 94 automatically resets when a predetermined temperature is reached.

Switch 98 is a pressure activated switch located on conduit 36 as shown in FIG. 1. In the unlikely event of excessive back pressure within conduit 36 caused by a blocking of vent 40 or excessive condensate build up within manifold 22 or the like, switch 98 opens. This de-energizes fuel valve 28 thereby cutting off the flow of fuel for combustion into module 12.

Although furnace 10 has been described with respect to specific details of certain preferred embodiments, it is not intended or required that such details limit the scope of the invention as set forth in the following claims. It will be apparent that various modifications and changes may be made by those skilled in the art without departing from the spirit of the invention as expressed in the accompanying claims. Hence, all matters shown and described are intended to be interpreted as illustrative and not in a limiting sense.

What is claimed is:

1. A forced air heating system, comprising:
   means for combusting fuel;
   a recuperative heat exchanger adapted for receiving products of combustion from said combusting means;
   means for forcing air into heat exchange relationship with said recuperative heat exchanger, said air being heated by thermal transfer from said products of combustion, said air further being heated by heat of condensation resulting from a portion of said products of combustion condensing in said recuperative heat exchanger; and
   means for removing condensed products of combustion from said system comprising means for flushing with water.

2. The system recited in claim 1 further comprising a second heat exchanger adapted for receiving a fluid heated by said combusting means, said air also being forced in heat exchange relationship with said second heat exchanger.

3. The system recited in claim 1 wherein said recuperative heat exchanger comprises a plurality of stainless steel tubes in thermal communication with fins and stainless steel input and exhaust manifolds respectively communicating with the ends of said plurality of tubes.

4. The system recited in claim 3 wherein said flushing means comprises means for directing a flow of water through said input and exhaust manifolds.

5. The system recited in claim 4 wherein said combusting means and said flushing means are alternately energized.

6. A forced air heating system, comprising:
 means for combusting fuel having an outlet for exhausting gaseous products of combustion;
 a heat exchanger;
 a manifold coupled between said outlet and said heat exchanger for directing said gaseous products of combustion to said heat exchanger;
 means for forcing air against said heat exchanger, said air being heated by thermal transfer from said gaseous products of combustion, said air further being heated by heat of condensation given off by a portion of said gaseous products of combustion condensing in said heat exchanger;
 means for draining condensate from said heat exchanger and said manifold; and
 means for flushing water through said manifold after a combustion cycle of said combusting means to remove residual condensate.

7. The system recited in claim 6 wherein said heat exchanger comprises a plurality of stainless steel tubes surrounded by heat transfer fins.

8. The system recited in claim 6 wherein said manifold is fabricated from stainless steel.

9. The system recited in claim 6 wherein said flushing means comprises a water valve coupled to said manifold, said water exiting said manifold through said condensate draining means.

10. The system recited in claim 6 further comprising an exhaust manifold coupled to the output of said heat exchanger, said condensate draining means and said flushing means being connected to said exhaust manifold.

11. A residential forced air recuperative heating furnace, comprising:
 a burner;
 means for supplying a combustible fuel mixture to said burner;
 a heat exchanger having a plurality of pipes in thermal communication with thermal fins;
 a manifold coupled between said burner and said heat exchanger for transferring products of combustion from said burner to said pipes;
 an exhaust manifold coupled to said tubes at the output of said heat exchanger;
 a flue connected to said exhaust manifold;
 a blower for forcing air across said thermal fins to preheat said air by thermal transfer from said products of combustion and by heat of condensation given off by said products of combustion condensing within said pipes;
 said input and exhaust manifolds having drains coupled to tubes for draining condensate from said manifolds; and
 water lines from a water valve connected to said input and exhaust manifolds for flushing residual condensate after a burning cycle of said burner.

12. The method of heating forced hot air in a residential burner, comprising the steps of:
 combusting fuel;
 passing the products of combustion through a manifold to a plurality of tubes of a recuperative heat exchanger;
 forcing air over said heat exchanger to heat the air from thermal transfer from the products of combustion and from heat of condensation from said products of combustion condensing in said heat exchanger;
 draining the condensate formed by said condensing from said tubes and said manifold; and
 flushing water through said manifold after the completion of the burning cycle to remove residual condensate.

* * * * *